United States Patent [19]

Archambeault et al.

[11] Patent Number: 5,545,804
[45] Date of Patent: Aug. 13, 1996

[54] METAL FIXATION IN OILY WASTE CONTAMINATED SOIL USING MICROWAVE RADIATION ACTING ON IN-SITU PRODUCED COUPLING AGENT

[75] Inventors: Gary L. Archambeault, Sarnia; William J. Murphy, Brights Grove, both of Canada; Edmund M. Mackert, Baytown, Tex.

[73] Assignee: Exxon Research and Engineering Company, Florham Park, N.J.

[21] Appl. No.: 395,340

[22] Filed: Feb. 28, 1995

[51] Int. Cl.$^6$ .............................. B09B 3/00; E21B 36/00
[52] U.S. Cl. ..................... 588/253; 166/248; 166/302; 405/128; 405/131
[58] Field of Search ................... 405/128, 130, 405/131, 258; 588/253, 256; 166/248, 302

[56] References Cited

U.S. PATENT DOCUMENTS

| | | | |
|---|---|---|---|
| 4,376,598 | 3/1983 | Brouns et al. | 405/258 |
| 4,670,634 | 6/1987 | Bridges et al. | 405/131 X |
| 4,973,811 | 11/1990 | Bass | 405/131 X |
| 5,076,727 | 12/1991 | Johnson et al. | 405/128 |
| 5,110,364 | 5/1992 | Mazur et al. | 210/757 X |
| 5,169,263 | 12/1992 | Johnson et al. | 405/128 |
| 5,190,405 | 3/1993 | Vinegar et al. | 405/128 |
| 5,193,934 | 3/1993 | Johnson et al. | 405/128 |
| 5,205,912 | 4/1993 | Murphy | 204/157.15 |
| 5,205,915 | 4/1993 | Ravella et al. | 204/157.15 |
| 5,209,604 | 5/1993 | Chou | 405/128 |
| 5,287,818 | 2/1994 | Rajamannan | 405/131 X |
| 5,370,477 | 12/1994 | Bunin et al. | 405/128 |

OTHER PUBLICATIONS

"Microwave Treatment of Hazardous Wastes: Removal of Volatile and Semi–Volatile Organic Contaminants from Soil", Windgasse, et al, Journal of Microwave Power and Electromagnetic Energy, vol. 27, No. 1, 1992, pp. 23–32.

"Microwave Treatment of Hazardous Wastes: Fixation of Chromium in Soil", Sedhom, et al, Journal of Microwave Power and Electromagnetic Energy, vol. 27, No. 2, 1992, pp. 81–86.

"Microwave Treatment of Hazardous Wastes: Remediation of Soils Contaminated by Non–Volatile Organic Chemicals Like Dioxins", Zhu, et al, Journal of Microwave Power and Electromagnetic Energy, vol. 27, No. 1, 1992, pp. 54–61.

*Primary Examiner*—George A. Suchfield
*Attorney, Agent, or Firm*—Joseph J. Allocca

[57] ABSTRACT

Heavy metals contaminants in soils are fixed and rendered non-leachable by the process of heating the metal contaminated soil containing a hydrocarbon liquid, at an elevated temperature sufficient to convert at least a part of the liquid hydrocarbon into solid carbon or coke deposited on the surface of the soil and subjecting the thus heated soil to sufficient microwave radiation to sustain at least a partial fusion or melting process that results in a fixing of the heavy metals in the soil.

7 Claims, 1 Drawing Sheet

METAL FIXATION IN OILY WASTE CONTAMINATED SOIL USING MICROWAVE RADIATION ACTING ON IN-SITU PRODUCED COUPLING AGENT

BACKGROUND OF THE INVENTION

1. Field of the Invention

The present invention relates to the fixation of heavy metal contaminants present in soil using microwave radiation. More particularly, it relates to a method for fixing and rendering non-leachable the heavy metal contaminants present in soil contaminated with heavy metal containing oily wastes such as refinery waste oil streams.

2. Description of the Related Art

The treatment of metal- and oil-contaminated soils is the subject of much ongoing research. This is so because of the limits on the amount of hazardous wastes which can be discharged into the environment and the requirement that contaminated sites be cleaned up. Microwave radiation has been investigated as useful in remediation/clean-up activities, see for example "Microwave Treatment of Hazardous Wastes: Removal of Volatile and Semi-Volatile Organic Contaminants From Soil" Windgasse et al, Journal of Microwave Power and Electromagnetic Energy, Vol. 26, No. 1, 1992, pp. 23–32; "Microwave Treatment of Hazardous Wastes: Fixation of Chromium in Soil", Sedhom et al, Journal of Microwave Power and Electromagnetic Energy, Vol. 27, No. 2, 1992, pp. 81–86; "Microwave Treatment of Hazardous Wastes: Remediation of Soils Contaminated by Non-Volatile Organic Chemicals Like Dioxins", Zhu et al, Journal of Microwave Power and Electromagnetic Energy, Vol. 27, No. 1, 1992, pp. 54–61.

Numerous patents also address the use of microwave radiation energy in decontaminating soil contaminated with heavy metals and/or oily wastes. See U.S. Pat. No. 5,209,604; U.S. Pat. No. 5,193,934; U.S. Pat. No. 5,190,405; U.S. Pat. No. 5,169,263; U.S. Pat. No. 5,110,364; U.S. Pat. No. 5,076,727.

THE PRESENT INVENTION

Figure 1:
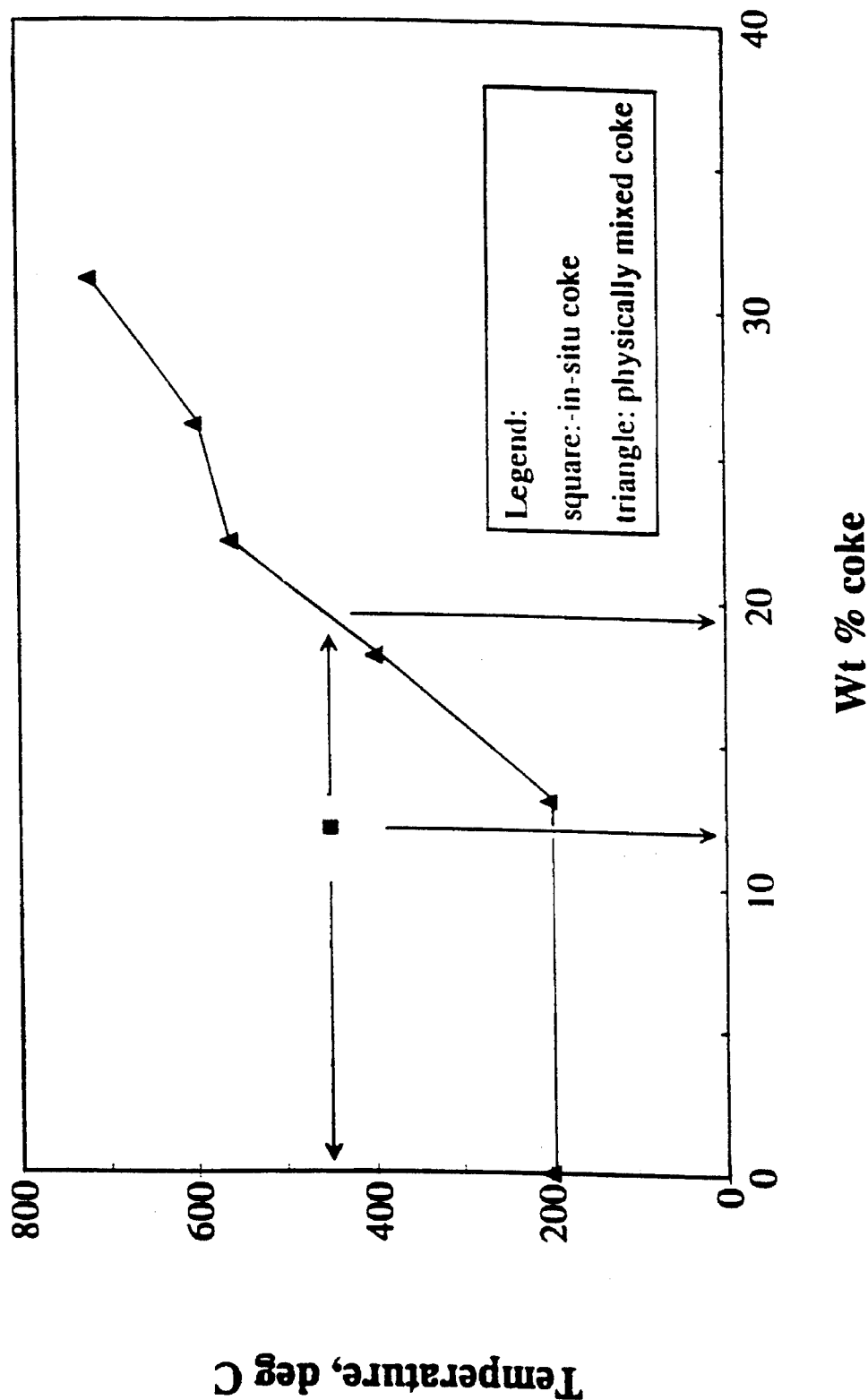
FIGURE 1 compares the temperature achievable upon microwaving soil containing in-situ coke verses added physically mixed coke at various coke loading levels.

It has been discovered that soils contaminated with heavy metals can be decontaminated by fixing the heavy metals in the soil using microwave radiation. Heavy metal contaminations are present in the soil either as a result of simply dumping waste metal tailings or other metal containing wastes or from the dumping of oil wastes containing heavy metal.

The metal contaminated soil, wetted with hydrocarbon, said hydrocarbon being present either as deliberately added material or present as a consequence of dumping oily wastes containing heavy metal, is heated at elevated temperatures to convert in-situ at least a portion of the hydrocarbon into carbon or coke and subsequently subjecting the heated soil containing the in-situ produced carbon or coke to microwave radiation at an energy level and for a time sufficient to at least partially fuse or melt the vitrifiable material in the soil, e.g. siliceous material thereby fixing the heavy metals present in the contaminated soil. The vitrifiable material, such as siliceous material (e.g., silicon dioxide or sand) in the soil melts forming a glass that fixes or fuses with the heavy metal contaminants. The in-situ formed carbon or coke act as a coupling agent to aid in energy transfer.

The hydrocarbon with which the metal contaminated soil is wetted is present either as deliberately added hydrocarbon or is already present in the soil as a consequence of dumping oily waste containing the metal contaminant. The hydrocarbons are typically refinery streams such as crude oil bottoms, heavy vacuum or atmospheric crude still gas oils, residual gas oils, process gas oils, fractionator bottoms, heavy gas oils from fluid catalytic cracking or coking process, lubricating oil extracts, other accidentally spilled or discharged hydrocarbon streams or dumped oily waste refinery streams, e.g. oily waste water stream.

The soil to be treated contains from 0.1 to 30 wt % hydrocarbon, preferably 10 to 30 wt % hydrocarbon, most preferably about 20 wt % hydrocarbon. The hydrocarbon present as a result of spills or oily waste dumping can be any hydrocarbon oil but typically is a heavy aromatic or polyaromatic hydrocarbon having a mean average boiling point of about 450° C. and higher.

If non-oily soil contaminated with heavy metal is to be treated, hydrocarbon is deliberately added to the soil, the soil being mixed with from 0.1 to 30 wt %, preferably 10 to 30 wt %, most preferably about 20 wt % hydrocarbon having a mean average boiling point of about 150° C. and higher, preferably about 250° C. and higher most preferably about 350° C. and higher. These added hydrocarbons can be paraffinic, naphthenic or aromatic, but heavy aromatics or poly aromatics streams such as typical refinery waste streams or low value hydrocarbon streams are preferred from an economic perspective.

The oily soil is heated to convert at least part of the hydrocarbon into carbon or coke deposited on the soil particle, hereinafter referred to as in-situ carbon or coke.

If excess oil is present, it can be removed by mechanical means prior to the heating step such as pumping, skimming, etc.

The oily soil is heated at temperatures above the mean average boiling point of the hydrocarbon present in the soil, e.g., in the range of at least about 400° to 600° C. for a timer period sufficiently long for the hydrocarbon to be converted into coke. The time-temperature relationship will depend on the hydrocarbon type, boiling range and soil. However, in general one would expect that at lower temperatures it would take longer to form coke than at higher temperatures.

Heating is performed in an inert atmosphere, such as nitrogen, argon, helium, CO or $CO_2$ or a vacuum, etc., using any convenient indirect heating technique such as electrical heating, fired furnaces, kilns, etc.

Heating can also be conducted in atmospheres containing hydrocarbon species. This refinery gases containing e.g. methane, ethane, etc. and mixtures of gases, and including CO and $CO_2$ in their make-up can be used as heating atmospheres.

Heating is continued until no hydrocarbon vapors are driven off from the soil being treated and a layer of coke or carbon is deposited on the soil particles. This in-situ coke or carbon will typically constitute about 0.1 to 40 wt %, preferably 5 to 30 wt %, most preferably about 10 wt % of the total solid material.

This heated soil is then subjected to microwave radiation.

The frequency of the microwave source can vary broadly. Typically, however, the microwave energy will have a frequency of at least 0.3 GHz, with frequencies centered around 0.915, 2.45, 5.80, or 22.0 GHz being presently preferred in North America; particularly frequencies centered around 0.915, 2.45, or 5.80 GHz; especially frequencies centered around 0.915 or 2.45 GHz. The microwave energy may be continuous or pulsed. If pulsed, the duration of on-time pulses can vary broadly, but most preferably from about 0.01 to about 0.2 seconds. The duration of off-time rests can vary broadly as well, but typically will range from about 1 nanosecond to about 100 seconds, preferably from about 0.003 to about 60 seconds, and most preferably from about 0.3 to about 5 seconds.

Microwaves transfer energy by coupling e.g. with the dipole of a molecule such as occurs with water in a typical microwave oven used for cooking, and via a number of other mechanisms well known in the art. In general, however, materials having large dielectric constants or high loss tangents couple very well. Such a material is carbon in a number of its various polymorphic forms including the amorphous forms known as coke and carbon blacks. The current invention shows that through the use of carbon formed in-situ as a coupling agent to aid energy transfer, solid average temperatures as high as 1450° C. (as evidenced by the occasional melting of the quartz glass reactor) can be achieved in 5–10 minutes depending on power input, mass of solids material, etc. As a result, the solids can be vitrified rendering heavy metals present non-leachable. The carbon layer provides the necessary coupling for enhanced microwave absorption and consequent heating to sustain other processes such as a partial fusion or melting process of the vitrifiable material in the soil, e.g., siliceous material that may be used for (but not limited to) fixation of heavy metal contaminants.

It has been found that in-situ produced coke or carbon is superior to added coke or carbon treating metal contaminant soils by microwave radiation.

The present process of microwave treatment of metal contaminated soil containing in-situ coke or carbon is effective for fixing and rendering non-leachable a vast slate of non-volatile metals and environmentally objectionable metals and heavy metals including but not limited to aluminum, calcium, cadmium, cobalt, copper, iron, potassium, magnesium, molybdenum, manganese, sodium, nickel, zinc, vanadium etc.

The invention is demonstrated in the following non-limiting examples.

EXAMPLE 1

Demonstrates the improvement in temperature rate with in-situ coke production on a soil versus physical mixing coke with the soil.

Various amounts of fluid coke were physically mixed with soil 'A' and then the mixture was heated, under flowing nitrogen, (25 SCF/hr) in a quartz reactor, with 700 watts of 2.45 GHz microwave energy for 10 mins after which the temperature increase was monitored. FIG. 1 shows the plot of the final temperature with respect to the percentage of coke added.

In-situ coke formation of Soil 'A' was carried out by mixing the soil with a solution of a 524° C.+ fraction of a Western Canadian Heavy Crude in Toluene for 1.5 hrs, evaporating of the Toluene and thermally heating the hydrocarbon/soil mix at 500° C. for 4 hrs in flowing nitrogen. The coked soil so produced had a coke content of 12 wt %. This in-situ coked soil was treated with microwave energy as described above and the final temperature measured. This data is also plotted on FIG. 1. FIG. 1 clearly shows that in-situ coking of soil results in much higher temperatures (400° vs 200° C.) than that obtained by physically mixing the soil and coke. Alternatively FIGURE 1 shows that a given final temperature can be obtained with much lower levels of in-situ produced coke (12 wt %) as compared to that required for physically mixed coke (18 wt %).

The term temperature as noted is taken to mean the average temperature of the soil. To those skilled in the art of microwave heating, the temperature distribution in a solid material during microwave heating, can be very hetrogeneous, being high on some parts of the bulk and the surface and low on others (see A. C. Metaxas and R. J. Meredith "Industrial Microwave Heating", p. 97–98, Pub Peter Peregrinus Ltd. London, U.K. 1983).

EXAMPLE 2

Demonstrates that increasing the level of in-situ coke formation increases the final temperature obtained by microwave processing.

In two separate experiments in-situ coke formation on a Soil 'B' (Southdown) was carried out by mixing the soil (a) with a refinery slop oil and thermally heating the hydrocarbon/soil mix at 500° C. for 4 hrs in flowing nitrogen and (b) with a residue derived from thermally processing API separator sludges from a large integrated refinery. The sludges contained heavy oils and greases prior to treatment at about 500° C. in an inert atmosphere. The coked soils so produced had a coke content of 5.5 and 7.6 wt % respectively. These in-situ coked soil samples were treated with microwave energy as described in Example 1 and the final temperature measured. This data is shown in Table 1 and illustrates that the final temperature increases as the level of in-situ coke increases.

TABLE 1

The difference in microwaved soil temperature achievable between adding coke and coking hydrocarbons on soil type B.

| | % coke | Temp °C. | Coking Temp °C. |
|---|---|---|---|
| Southdown decoked | 0.5 | 315 | |
| Southdown coked with refinery slop oil | 5.5 | 450 | 550 |
| Southdown coked with hydrocarbon (1) material | 7.6 | 778 | 480 |

Note 1: API separator sludge oil

EXAMPLE 3

Demonstrates that microwave processing can fix leachable heavy metals in a soil treated via in-situ coke formation.

The sample of in-situ coked soil 'B' as prepared in Example 2(b), i.e. that having 7.6 wt % coke, was irradiated with 560 watts of 2.45 GHz microwave energy for 3 min in a quartz reactor under flowing nitrogen. The leachable metal content of the soil before and after microwave treating as measured by the Leachate Extraction Method from Regulation 309 of the Province of Ontario, Canada, Ministry of the Environments, "Test Methods for Hazardous Wastes" (equivalent to the EPA Method 6010 for Analysis of Leachate Solutions (EPA SW-846 Test Methods for Evaluating Solid Waste)) is shown in Table 2. Table 2 clearly shows that after microwave treatment the levels of Nickel, Copper, Zinc, Manganese, etc. were significantly reduced.

TABLE 2

Comparison of the leachable metals in soil B before and after microwaving.

| Element | Before microwaving Average n = 10 mg/l | Std Dev. | After Microwaving Average n = 13 mg/l | Std Dev. | % Net Effect (1) + = increase − = decrease |
|---|---|---|---|---|---|
| Al | 3.19 | 0.34 | 0.01 | 0.02 | −99.7 |
| Ba | 0.35 | 0.06 | 1.3 | 0.27 | 271 |
| Ca | 1016 | 43 | 52 | 6 | −94.9 |
| Cd | 0.02 | 0.01 | 0 | 0 | no effect |
| Co | 0.09 | 0.02 | 0.11 | 0.04 | 22.2 |
| Cu | 2.1 | 0.24 | 0 | 0 | −100 |
| Fe | 0.08 | 0.13 | 8.67 | 4.91 | 10738 |
| K | 4.54 | 2.73 | 2.01 | 2.9 | −55.7 |
| Mg | 69.11 | 0.24 | 2.75 | 0.68 | −96 |
| Mn | 18.1 | 0.77 | 1.3 | 0.73 | −92.8 |
| Mo | 0.03 | 0.03 | 0 | 0 | no effect |
| Na | 88.24 | 3 | 11 | 1.56 | −87.5 |
| Ni | 1.52 | 0.22 | 0.51 | 0.35 | −66.4 |
| P | 0.06 | 0.17 | 0 | 0 | no effect |
| Si | 37.65 | 1.81 | 1.4 | 0.87 | −96.3 |
| Zn | 5.25 | 0.28 | 0.63 | 0.07 | −88 |

Note 1:
Confidence intervals is >99% except for potassium which was >94%.

What is claimed:

1. A method for fixing heavy metal contaminants present in soil in the presence of hydrocarbons in the soil, said method comprising heating metal contaminated soil in the presence of hydrocarbons in the soil at elevated temperatures to convert at least a portion of the hydrocarbon in situ into carbon or coke and subjecting the heated soil containing in situ carbon or coke to microwave radiation at an energy level and for a time sufficient to at least partially fuse or melt vitrifiable material in the soil, thereby fixing the heavy metals present in the contaminated soil.

2. The method of claim 1 wherein the metal contaminated soil contains 0.1 to 30 wt % hydrocarbon.

3. The method of claim 1 wherein hydrocarbon is added to the metal contaminated soil.

4. The method of claim 1, 2 or 3 wherein the hydrocarbon has a mean average boiling point of about 150° C. and higher.

5. The method of claim 1, 2 or 3 wherein the heating is at a temperature above the mean average boiling point of the hydrocarbon.

6. The method of claim 5 wherein the heating is at temperatures in the range of at least about 400° C. to 600° C.

7. The method of claims 1, 2 or 3 wherein the microwave radiation is at a frequency of at least 0.3 GHg.

* * * * *